United States Patent [19]
Wertli et al.

[11] 4,048,467
[45] Sept. 13, 1977

[54] APPARATUS FOR GENERATING AND REGULATING WELDING CURRENTS

[75] Inventors: Josef Wertli, Zufikon; Paul Matter, Muri, both of Switzerland

[73] Assignee: Firma WkS-Schweisstechnik Willy Kalnbach, Aalen, Switzerland

[21] Appl. No.: 647,647

[22] Filed: Jan. 8, 1976

[51] Int. Cl.² .............................................. B23K 9/10
[52] U.S. Cl. .................................. 219/131 R; 323/24
[58] Field of Search .......... 219/131 R, 131 WR, 135, 219/137 P, 137 S; 323/22 SC, 24; 317/14 H

[56] References Cited

U.S. PATENT DOCUMENTS

| | | | |
|---|---|---|---|
| 3,284,666 | 11/1966 | Hajicek | 219/131 R |
| 3,295,053 | 12/1966 | Perrins | 323/22 SC |
| 3,308,340 | 3/1967 | Gille et al. | 219/131 R |
| 3,323,017 | 5/1967 | Powell et al. | 323/22 SC |
| 3,374,420 | 3/1968 | Weber, Jr. | 323/22 SC |
| 3,641,311 | 2/1972 | Hildebrandt et al. | 219/131 WR |
| 3,684,942 | 8/1972 | Pettit, Jr. et al. | 219/131 WR |
| 3,849,705 | 11/1974 | McElroy | 317/14 H |
| 3,984,654 | 10/1976 | Hoffman et al. | 219/135 |

FOREIGN PATENT DOCUMENTS

| | | | |
|---|---|---|---|
| 47-21349 | 10/1972 | Japan | 219/131 R |
| 276,289 | 6/1969 | U.S.S.R. | 219/131 R |

Primary Examiner—Bruce A. Reynolds
Assistant Examiner—Clifford C. Shaw
Attorney, Agent, or Firm—Kenyon & Kenyon, Reilly, Carr & Chapin

[57] ABSTRACT

Apparatus for generating and regulating welding currents, having primary and secondary circuits connected through a transformer, an anti-parallel connection of two thyristors in the primary circuit, a choke in parallel with this anti-parallel connection and means which shift the phase of the turn-on pulses in the case of a short-circuit on the secondary side and in switching on.

8 Claims, 2 Drawing Figures

APPARATUS FOR GENERATING AND REGULATING WELDING CURRENTS

BACKGROUND OF THE INVENTION

1. Field of the Invention.

This invention relates to an apparatus for generating and regulating currents of high intensity, especially welding currents, by phase section, with primary and secondary circuits connected through a transformer.

2. Description of the Prior Art.

In a welding appliance of conventional type, the intensity of the welding current is modified by means of tappings on the primary or choke coil by means of tap changers. Regulation of the welding currents by means of hand wheels or cranks, which are most clumsy in operation, is also known. It is further known to regulate welding currents by means of transductors (Ger. Pub. Sp. 1,116,331). Such apparatuses have the disadvantage of large components an high energy consumption. They further require high switch-on currents. As a result of the great construction size of the parts, transport of the apparatus is difficult. The measures known hitherto for the regulation of welding currents further have the disadvantage that operation is complicated and remote controlling is not possible in the case of mechanical regulation.

According to the phase position and premagnetisation of the transformer plate, very high magnetisation currents occur on switching on of the welding currents, which suddenly overload the transformer, mains and fuses of the apparatus.

At the beginning of the welding operation the electrodes are in contact with the welded material. This effects high short-circuit currents which exceed the maximum rated current, frequently by 50%. The connected load of the welding apparatus, the rated value of the fuses and the conductor cross-section must be designed accordingly, possibly over-dimensioned, in order to exclude danger due to over-heating.

SUMMARY OF THE INVENTION

The object of the present invention is to provide a convenient apparatus for the regulation of currents of high intensity which works reliably and securely under various operational conditions (switch-on, welding and short-circuit operation) and is considerably more favourable as regards costs, both in production and in operation, than conventional apparatuses.

According to the invention in the primary circuit there lies an anti-parallel connection of two thyristors, a choke lies in parallel with this anti-parallel connection and means are provided which shift the phase of the turn-on pulses in the case of a short-circuit on the secondary side and in switching on. The invention avoids the disadvantages in the conventional appliances and achieves the following advantages: A more rapid and more simple current regulation, which can also be made remotely controllable. Moreover only minimum switch-on currents occur and no excessive short-circuit currents. The connected loads of this apparatus can be kept low. The current consumption is reduced as a result of lower reactive currents and no-load currents. The no-load losses and thus the heating are lower than in the case of conventional appliances. The no-load voltage can be kept constant over the entire regulating range. Moreover the apparatus according to the invention renders possible easier handling by remote control, so that the welder can conveniently vary the welding current in the case of variations of the welded material, such as warping. Since the current intensity can be kept low in the welding operation, danger of over-heating and fire is avoided. Safe operation is possible even in the case of long melting tasks. The fact that the current regulation can be effected steplessly has an especially favourable effect in the apparatus according to the invention.

According to an advantageous form of embodiment of the invention it is provided that the means for the regulation of the short-circuit and switch-on currents comprise a semi-conductor with RC-member and limiter diodes and a resistor in the RC-circuit of the phase section (phase angle) control part, the semi-conductor short-circuiting the resistor when the secondary voltage falls short of a limit value. A unijunction transformer programmable through a voltage divider can be provided here for the generation of turn-on pulses.

DESCRIPTION OF THE PREFERRED EMBODIMENT

Figure 1:
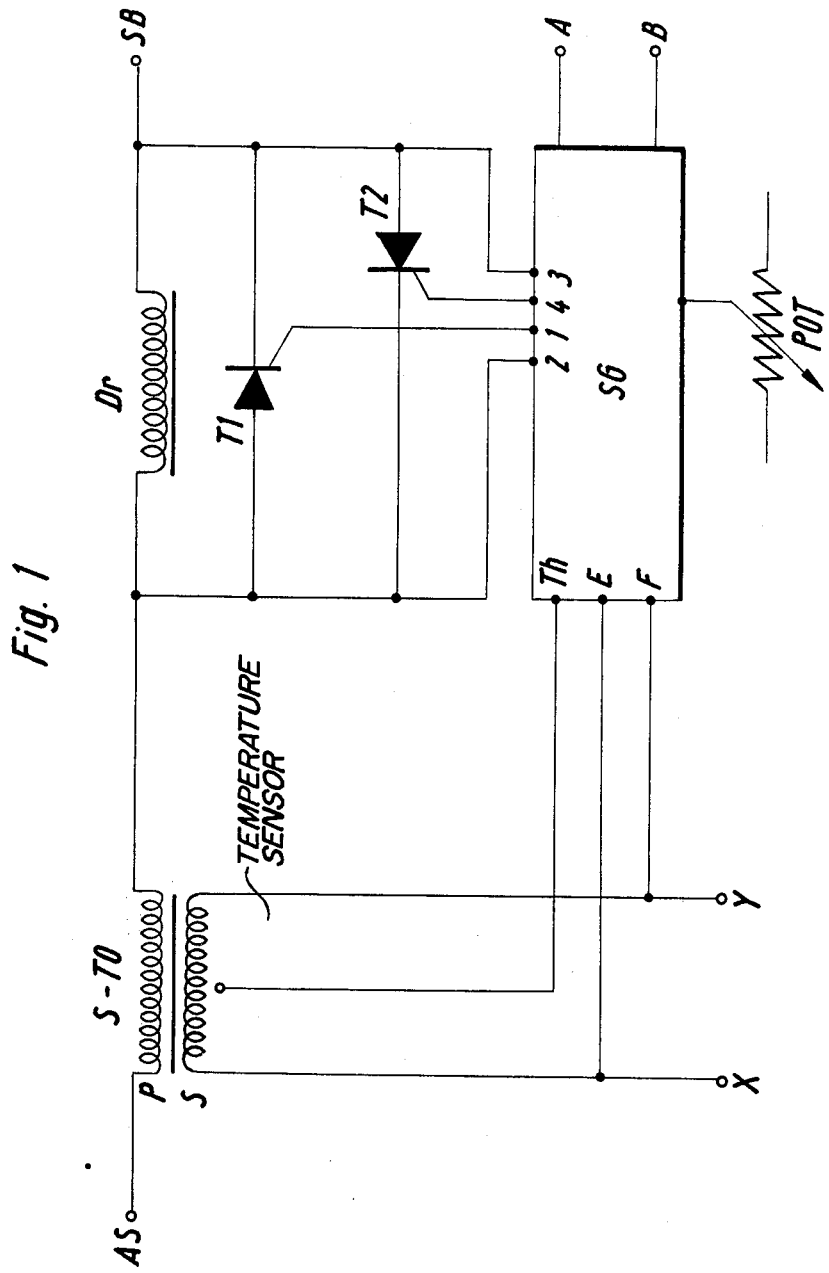
FIG. 1 shows a diagrammatic representation of the apparatus according to the invention, for example a welding appliance, as block circuit diagram.

As appears from FIG. 1, the primary circuit consists of the mains connection terminals AS and SB, an anti-parallel connection of two thyristors T1 and T2, parallel with which a choke Dr lies, and the primary winding of the welding transformer S-TO.

The secondary circuit consists of the secondary winding of the welding transformer S-TO with the connections X and Y for the welding electrodes. For the continuous regulation of the welding current, which the invention renders possible, the control circuit of the thyristors T1 and T2 is connected with terminals 1, 2, 3, 4 of a control part SG. The control part SG receives the supply of secondary voltage at terminals E, F. The control part SG is fed through mains connection terminals A and B. A potentiometer POT is arranged outside the control appliance SG. A temperature-responsive switch Th short-circuits the feed current of the control appliance SG in the case of excessive temperature.

The thyristors T1 and T2 work in the known manner of phase section control. They act like diodes in the forward direction as soon as a current pulse turns them on. A thyristor is allocated to each half wave of the alternating current. According to the moment of the turn-on pulse in the course of a half wave, the thyristor becomes conductive for the remainder of the phase. Since a thyristor blocks again after every change of current direction, it must be turned on afresh when positive voltage is present on the anode. The effective current values of the thyristors are added to the basic current of the choke Dr. Thus the curves of the phase sections are rounded off, the harmonics are greatly reduced and high frequency interference eliminated. Steep current rises with their negative effects are eliminated. Through the potentiometer POT the current intensity is regulated in that the phase of the turn-on pulse is modified. The potentiometer is advantageously built into the electrode holder so that it can be actuated during the welding operation by the welder to vary the current intensity of the welding current.

Moreover a temperature-responsive switch Th is provided which short-circuits the feed current of the control appliance SG in the case of excess temperature, whereby the thyristors receive no more control pulses at the terminals 1 to 4.

The choke Dr is so dimensioned as regards number of turns, air gap and iron core, that it is optimally adapted to the welding transformer S-TO. In the switch-on operation the choke Dr according to the invention has the effect that only slight magnetisation currents can occur as a result of the ohmic resistance of the thin-wired choke winding and as a result of the reactive resistance of the choke. In no-load operation the choke Dr reduces the no-load current of the transformer to about a third of the rated value. In this case the choke must have the smallest possible inductive resistance in order to guarantee the most constant possible no-load voltage. The energy consumption for the magnetisation of the iron core is reduced and the heating in no-load operation is less. In the welding operation the dimensioning of the choke Dr determines the minimum welding current when the thyristors are not yet effective. As a result of its many functions under the above-mentioned operating conditions the choke together with the thyristors forms an essential component of the apparatus according to the invention.

Figure 2:
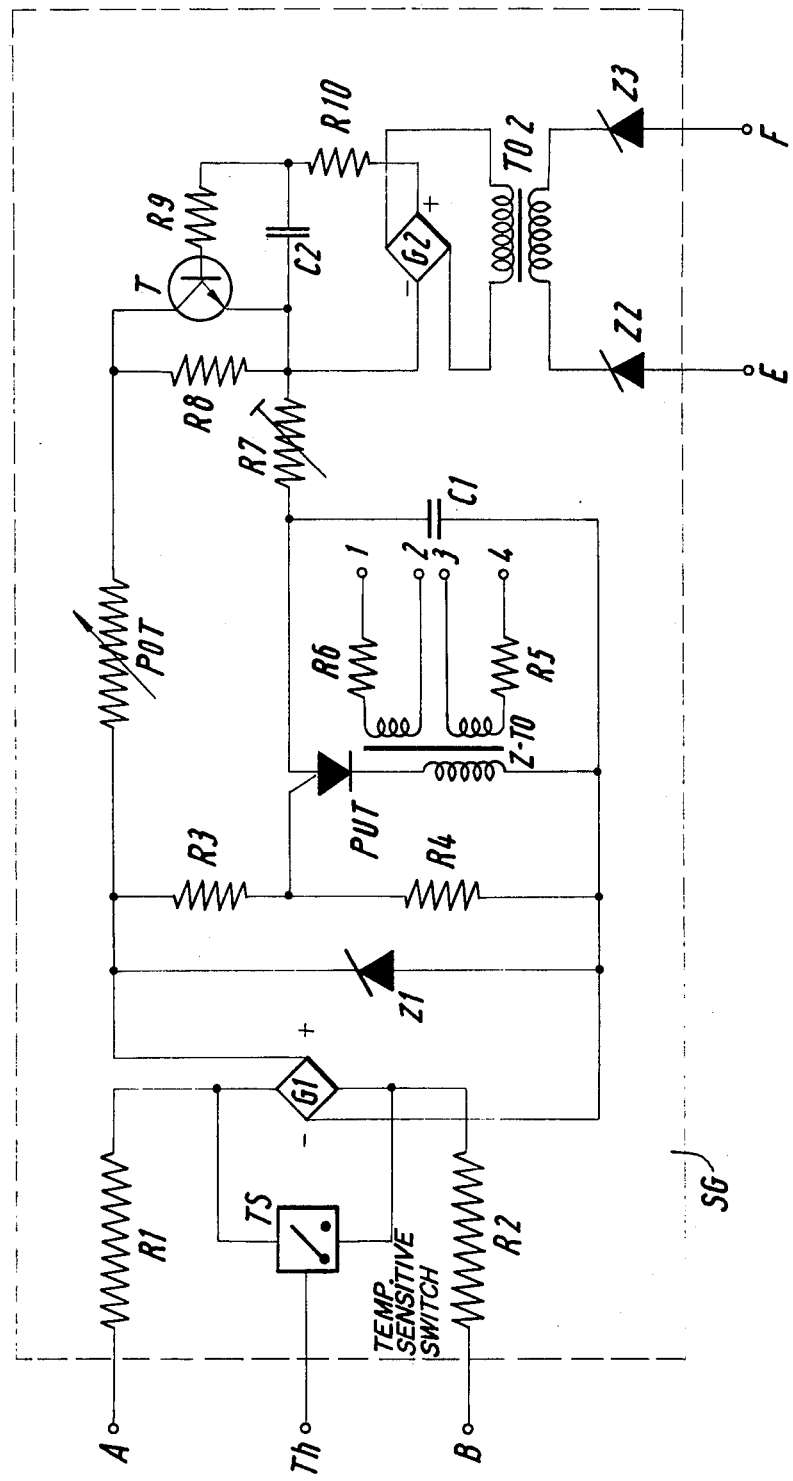
FIG. 2 shows a circuit diagram of the control part of the apparatus according to FIG. 1.

FIG. 2 shows an example of embodiment of the control part SG with which the above-described solutions (phase section method, short-circuit monitoring, temperature monitoring) can be realised. The potentiometer POT is included here. However to increase the comfort of operation it can be arranged separately from the control part SG, as is indicated in FIG. 1 and will be preferred. For the phase section control the control pulses are generated with an RC-member and a preferably programmable unijunction transistor PUT. From the terminals A and B the mains current passes through resistors R1 and R2 to a Gratz rectifier G1. A Zener diode Z1 stabilises the voltage to a desired value, for example approximately 22 V, in order to guarantee an adequate turn-on voltage for the apparatus. The level of the charge voltage on the capacitor Cl is determined by a voltage divider R3, R4. The level of the charge voltage on the capacitor Cl at which the uni-junction transistor PUT switches through is determined by the voltage divider R3, R4. If now current flows from the positive pole through the potentiometer POT through a resistor R8 and a trimming resistor R7, then Cl is charged up. When the determined charge voltage is reached, the unijunction transistor PUT suddenly switches through and the capacitor Cl discharges itself through the primary coil of a turn-on transformer Z-TO. The turn-on pulses control the thyristors T1 and T2 through resistors R5 and R6. The moment in time of turn-on commencement is set by the potentiometer to POT. The effective welding current intensity also varies accordingly. The trimming resistor R7 serves for the tuning at the works of the RC-member formed by the resistors R7, R8 the potentiometer POT and the capacitor Cl, and is adjusted once according to the requirements of the user.

If the welding voltage drops below a limit value determined by the Zener diodes Z2 and Z3, a transformer TO2 is fed. The current is rectified in a Gratz rectifier G2 and fed to an RC-member R10/C2. When the apparatus is switched on therefore the transistor T remains for a short time in the blocking phase; the resistor R8 is fully effective and sets the gate pulses back in time. The high switch-on currents practically cannot pass through the thyristors. The high switch-on currents consequently flows through the choke Dr and is limited by the latter. The resistor R8 likewise remains fully in operation, if as a result of a short-circuit in the welding electrodes, for example due to contact between the electrodes and the welding material, the secondary voltage drops below the limit value. In this case the resistor R8 determines the level of the maximum short-circuit current, in that it sets back the turn-on pulses in time.

On the other hand under no-load or welding operation the base of the transistors T receives current through the resistor R9; the resistor R8 is bridged over and remains ineffective. The potentiometer POT alone determines the welding current regulation.

The short-circuit current limitation is made clear by the following table which compares the characteristic values of a welding appliance according to the invention with limitation of the secondary short-circuit current to 100 A and a welding appliance of conventional construction type with mechanical regulation without such limitation, the basis being adopted of a range of regulation from 30 to 250 A with a mains voltage of 380 V (all figures in A):

| Welding current | Mains current in welding | prime. short-circuit current | | sec. short-circuit current | |
| --- | --- | --- | --- | --- | --- |
| | | Convent. | Acc. to Inv. | Convent. | Acc. to Inv. |
| 30 | 8.5 | 12.7 | 12.7 | 38 | 38 |
| 100 | 21.5 | 28.8 | 21.5 | 122 | 100 |
| 150 | 27.2 | 36.3 | 21.5 | 177 | 100 |
| 250 | 34.8 | 48.1 | 21.5 | 286 | 100 |

The underlined values indicate the superiority of the apparatus according to the invention.

A welding appliance was described above as form of embodiment of the apparatus according to the invention. It is however readily possible to apply the invention usefully with all its advantages wherever high currents are to be regulated under different operational conditions. Use in electric motors, for example fan motors, or in rectifier stations and apparatuses for stepless regulation for direct and alternating-current drive systems may be mentioned as examples. It is immaterial here whether it is a matter of single-phase of polyphase systems.

We claim:

1. Apparatus for generating and regulating high intensity welding currents which are developed in a welding apparatus having electrodes which are brought in contact with a workpiece comprising:
   a. a transformer having a primary winding and a secondary winding, the welding current which is to be regulated being taken from across the secondary winding, said secondary winding being coupled to the electrodes;
   b. a choke coupled in series with the primary winding across an a.c. power source;

first and second thyristors coupled in parallel with each other and in parallel with the choke and thyristors arranged so as to have opposite polarity;

d. variable phase triggering means for developing firing pulses for said thyristors to control the point in the positive and negative half cycles of the a.c. power at which they are fired, said triggering means including a first RC timing circuit having at least a resistor and capacitor in series; and e. means associated with said variable phase triggering means for causing the firing pulse outputs thereof to be shifted in a direction to reduce the effective currents through the thyristors both during turn on of the apparatus and in the case of a short circuit of the secondary of the transformer, said means comprising a semiconductor switch coupled in parallel with said resistor in said first RC timing circuit, said switch having a control electrode, means coupled to the secondary of said transformers for generating a control signal when the voltage at said output is greater than a predetermined value, and a second RC circuit coupling said control signal to the control terminal of said semiconductor switch.

2. Apparatus according to claim 9 wherein said secondary of said transformer is coupled to welding electrode holders, said electrode holders holding said electrodes which are brought in contact with said workpiece.

3. Apparatus according to claim 2 wherein said means for developing a control signal comprise.
 first and second zener diodes each having one end coupled to one of the sides of the secondary of said transformer;
 a second transformer having the two sides of its primary coupled to the other sides of said zener diodes; and
 a rectifier coupled across the secondary of said second transistor and providing said control signal as its output signal.

4. Apparatus according to claim 2 wherein said timing circuit in said triggering means is a programmable unijunction transistor timing circuit.

5. Apparatus according to claim 2 wherein said variable phase triggering means includes in said timing circuit a potentiometer for controlling the firing point and wherein said potentiometer is located at said electrode holder.

6. Apparatus according to claim 1 and further including a temperature responsive switch disposed at a point of unacceptable heat generation in said apparatus, said switch having outputs coupled to disable the generation of trigger pulses.

7. Apparatus according to claim 6 wherein said temperature responsive switch is disposed on said first transformer.

8. Apparatus according to claim 7 wherein said temperature responsive switch is disposed on the winding of said transformer.

* * * * *